United States Patent
Song et al.

(10) Patent No.: US 8,059,225 B2
(45) Date of Patent: Nov. 15, 2011

(54) V-SHAPED PALLET COMPRISING A MAIN PALLET AND AN AUXILIARY PALLET HAVING FIRST AND SECOND PLANE SECTIONS JOINTED IN A V-SHAPE CONFIGURED FOR A LIQUID CRYSTAL DISPLAY PANEL

(75) Inventors: Un Ho Song, Gumi-si (KR); Chang Yong Lee, Daegu (KR); Jung Sick Chae, Daegu (KR)

(73) Assignee: LG Display Co., Ltd., Seoul (KR)

( * ) Notice: Subject to any disclaimer, the term of this patent is extended or adjusted under 35 U.S.C. 154(b) by 245 days.

(21) Appl. No.: 11/835,150

(22) Filed: Aug. 7, 2007

(65) Prior Publication Data
US 2008/0036939 A1 Feb. 14, 2008

(30) Foreign Application Priority Data
Aug. 8, 2006 (KR) .................. 10-2006-0074790

(51) Int. Cl.
*G02F 1/1333* (2006.01)
*B65D 19/38* (2006.01)
*B65D 85/00* (2006.01)

(52) U.S. Cl. ............... 349/58; 108/57.26; 206/521.9

(58) Field of Classification Search .............. 349/58; 206/454, 521, 521.9; 108/57.26, 57.28, 901
See application file for complete search history.

(56) References Cited

U.S. PATENT DOCUMENTS
2007/0131574 A1 * 6/2007 Aoki .................... 206/454

FOREIGN PATENT DOCUMENTS
| JP | 60-175028 U | 11/1985 |
| JP | 1-61038 U | 4/1989 |
| JP | 6-14033 U | 2/1994 |
| JP | 2003183058 A * | 7/2003 |
| WO | WO 2006009225 A1 * | 1/2006 |

OTHER PUBLICATIONS
JP 2003183058 A, English Machine Translation, Jul. 2003.*
* cited by examiner

*Primary Examiner* — Mark Robinson
*Assistant Examiner* — Paul Lee
(74) *Attorney, Agent, or Firm* — Birch, Stewart, Kolasch & Birch, LLP

(57) ABSTRACT

A V-shaped pallet that is adaptive for reducing the damage of a liquid crystal display panel by minimizing a contact area with the liquid crystal display panel of a liquid crystal display device is discussed. A V-shaped pallet according to an embodiment of the present invention includes a main pallet; an auxiliary pallet on which a liquid crystal display device is put for performing a module process for the liquid crystal display device and of which the middle part subsides to have a V-shape as a whole; and a plurality of supporters formed on the main pallet for fixing the auxiliary pallet to the main pallet.

9 Claims, 7 Drawing Sheets

V-SHAPED PALLET COMPRISING A MAIN PALLET AND AN AUXILIARY PALLET HAVING FIRST AND SECOND PLANE SECTIONS JOINTED IN A V-SHAPE CONFIGURED FOR A LIQUID CRYSTAL DISPLAY PANEL

This application claims the priority benefit of the Korean Patent Application No. 10-2006-0074790 filed on Aug. 8, 2006, which is hereby incorporated by reference.

BACKGROUND OF THE INVENTION

1. Field of the Invention

The present invention relates to a pallet, and more particularly to a pallet that transfers a liquid crystal display device in a fabrication process line of the liquid crystal display device.

2. Description of the Related Art

Generally, a liquid crystal display (hereinafter, referred to as "LCD") device is a representative flat panel display device which controls the transmittance of light beam to correspond to video signals, thereby displaying a picture. Especially, the LCD device is on a trend of its application scope being broadened due to characteristics such as lightness, thinness, lower power consumption drive and the like. According to such a trend, the LCD device is used in office automation devices and the display devices of notebook computers.

FIG. 1 is an exemplary diagram representing a liquid crystal display panel of a liquid crystal display device of the related art, and FIG. 2 is a flow chart representing a fabrication process of the liquid crystal display device of the related art.

That is to say, as shown in FIG. 1, a liquid crystal display panel 10 of the liquid crystal display device includes a thin film transistor (hereinafter, referred to as "TFT") substrate 11 for receiving drive signals; a color filter (hereinafter, referred to as "C/F") substrate 12 inclusive of a color filter layer; and a liquid crystal layer 13 interposed between the TFT substrate and the C/F substrate.

The whole fabrication process of the liquid crystal display device inclusive of the liquid crystal display panel 10 described above, as shown in FIG. 2, is divided into a substrate fabrication process S202, a liquid crystal display panel process S204, a liquid crystal display panel inspection process S206 and a module process S208.

First of all, the substrate fabrication process S202 is divided into a process of fabricating the TFT substrate in use of a cleaned glass substrate and a process of fabricating the C/F substrate. The TFT substrate fabrication process is a process of forming signal lines, a plurality of thin film transistors and pixel electrodes on a lower glass substrate. The C/F substrate fabrication process is a process of sequentially forming a black matrix, a color filter layer and a common electrode ITO on an upper glass substrate.

Next, the liquid crystal display panel process S204 is a process of fabricating the liquid crystal display panel by bonding the TFT substrate and the C/F substrate together and by injecting liquid crystal therebetween. Generally, a plurality of liquid crystal display panels are formed in one original plate. The liquid crystal display panel process is made up of many unit processes such as an alignment film forming process, a rubbing process, a cell gap forming process, an assembly process, a cell cutting process, a liquid crystal injecting process, a grinding process and the like.

Next, the liquid crystal display panel inspection process S206 is a process of inspecting whether wires are down and whether there are dot defects and the like for the liquid crystal display panel which have been through the cell cutting process and the grinding process in the liquid crystal panel process. And, the liquid crystal display panel inspection process is confirmed personally by a user's eyes in use of an auto probe AP.

Lastly, the module process S208 is a final process of linking the liquid crystal display panel and a signal process circuit part, and the liquid crystal display device is completed by the module process.

FIG. 3 is an exemplary diagram representing a process line of the module process of the related art, and shows the module process S208 in detail. Further, FIG. 4 is an exemplary diagram representing a usage state of a flat pallet of the related art, and each process shown in FIG. 3 is performed for the liquid crystal display device put on the flat pallet.

At this moment, each process part shown in the drawings is connected through a conveyor, and each process will be briefly explained as follows.

Firstly, a liquid crystal display panel loading section 31 is for loading the liquid crystal display panel which has been through the liquid crystal display panel inspection process S206.

A TAB process section 32 is a place where a polarizer, a TCP and a PCB are combined with the liquid crystal display panel inputted by the loading section 31, and the polarizer, the TCP and the PCB can be manually combined by a plurality of workers or automatically combined by a robot and the like. At this moment, in order to prevent the damage from impurities, a resin is spread over data pads and gate pads formed on the TFT substrate of the liquid crystal display panel, and the TCP and the PCB are stuck onto the pads in use of an ACF being an anisotropic conductor.

A backlight joining section 33 is a place where the liquid crystal display panel and the backlight unit are joined. The backlight unit is configured to include a cover bottom which is of a plate shape and is formed of a metal or synthetic resin material; a reflector which is placed on the cover bottom, is of a plate shape and is formed of a metal material having a white or silver color; a plurality of lamps arranged in parallel on the reflector; and an optical sheet part placed on the lamps.

A top case combination section 34 is a place where a top case is combined with the upper part of the liquid crystal display panel in a state that the liquid crystal display panel is joined with the back light unit, and screws and the like are combined therewith so as for the top case and the liquid crystal display panel not to be separated.

A protection film adhesion section 35 is a place where a protection film is stuck thereto to protect the surface of the liquid crystal display panel which is combined with the top case, and is for preventing the surface damage of the liquid crystal display panel from being generated during the following process.

A reversal section 36 is a place for turning over the upper surface and the lower surface of the liquid crystal display device to which the protection film is stuck in the liquid crystal display panel in the state that the liquid crystal display panel is combined with the backlight unit. That is to say, the process up to the protection film adhesion section 35 is made in the state that the C/F substrate of the liquid crystal display panel, i.e., the surface of the liquid crystal display panel to which a picture is substantially outputted, faces upward.

A backlight combination section 37 is for completely combining the backlight unit and the liquid crystal display panel with the screws and the like while the upper surface of the backlight unit faces upward by the reversal section 36. And, an operation that the components of the backlight unit and the liquid crystal display panel are put into a support main and the like is simply made in the backlight joining section 33, and the components are completely combined by the backlight combination section 37.

A cable connection section 38 is a place for connecting various electrical cables and the like to the PCB substrates formed in the rear surface of the backlight unit which faces the upper surface.

An aging section 40 is a place for confirming whether there is a defect of the liquid crystal display device made by the processes above, and the liquid crystal display device is operated under a designated condition, e.g., for 4 hours in a space of 50° C., to be checked.

A final inspection section 41 is a place for confirming whether there is a defect of the product which has been through the aging section 40. The liquid crystal display device having been through the process in the final inspection section 41 is packed to be shipped out after finally completing the inspection.

Herein, the processes from the backlight joining section 33 to the backlight combination section 37 are called a pre-process in the assembly process of the related art, and the processes from the cable connection section 38 to the final inspection section 41 are called a post-process.

On the other hand, as described above, each process section is connected through a conveyor and the process in each process section is made in a flat pallet 60, as shown in FIG. 4.

That is to say, in the backlight joining section 33, the top case combination section 34, the protection film adhesion section 351 the reversal section 36, the backlight combination section 37, the cable connection section 38 and the like, as shown in FIG. 4, operators perform a process which is necessary in each process after locating the liquid crystal display device 70 on the flat pallet 60.

At this moment, in the process to the protection film adhesion section 35, the liquid crystal display panel faces upward and each process is performed in a state that the backlight unit is closely adhered to the flat pallet 60. However, in the backlight combination section 37, as shown in FIG. 4, each process is performed in a state that the liquid crystal display panel to which a protection film 71 is stuck is in contact with the flat pallet 60 for the combination of the backlight unit part, the connection of cables and the like.

On the other hand, the process is performed in the state that the liquid crystal display panel is in contact with the flat pallet 60 as described above in the backlight combination section 37, thus there is a problem in that inferior products might be generated because scratches are generated in the liquid crystal display panel by the friction with the flat pallet 60 and particles and the like formed on the flat pallet surface. Accordingly, in order to solve the above-mentioned problem in the related art, the liquid crystal display panel to which the protection film is stuck by the reversal section 36 is made to be in contact with the flat pallet 60, as shown in FIG. 4, after sticking the protection film 71 onto the surface of the liquid crystal display panel by the protection film adhesion section 35.

However, in order to stick the protection film 71, the component of the protection film is additionally required as well as a space like the protection film adhesion section 36 is required in the process, thus there is a problem in that there is a limit in space and a production cost is increased.

Further, there is a problem in that a labor cost is increased because operators for sticking the protection film 71 are additionally required.

Further, in the post-process, the final inspection should be carried out after removing the protection film 71 again, and especially, stains might be generated due to the protection film adhesion for performing the process in the aging section 40 which carries out the process of operating the liquid crystal display device at a high temperature. And, additional operators might be required in accordance with the re-adhesion of the protection film and the additional process due to the problem of there being generated a phenomenon that the protection film comes apart while being in the aging section or during the post-process.

SUMMARY OF THE INVENTION

Accordingly, it is an object of the present invention to provide a V-shaped pallet that is adaptive for reducing the damage of a liquid crystal display panel by minimizing a contact area with the liquid crystal display panel of a liquid crystal display device.

In order to achieve these and other objects of the invention, a V-shaped pallet according to an aspect of the present invention includes: a main pallet; an auxiliary pallet on which a liquid crystal display device is put for performing a module process for the liquid crystal display device and of which the middle part subsides to have a V-shape as a whole; and a plurality of supporters formed on the main pallet for fixing the auxiliary pallet to the main pallet.

In the V-shaped pallet, a subsiding part of the auxiliary pallet can be formed at a designated angle in accordance with the size of the liquid crystal display device.

In the V-shaped pallet, only an edge part of the liquid crystal display device may be in contact with the auxiliary pallet.

In the V-shaped pallet, the auxiliary pallet may be in contact with a top case of the liquid crystal display device.

A V-shaped pallet according to an aspect of the present invention includes: a main pallet; an auxiliary pallet on which a liquid crystal display panel is put; and a plurality of supporters located between the main pallet and the auxiliary pallet for fixing the auxiliary pallet to the main pallet, and the auxiliary pallet is formed in a V-shape thus a gap between the main pallet and the auxiliary pallet becomes smaller as it goes from the outer part thereof to the center thereof.

In the V-shaped pallet, only an edge part of the liquid crystal display device may be in contact with the auxiliary pallet.

In the V-shaped pallet, the auxiliary pallet may be in contact with a top case of the liquid crystal display device.

In the V-shaped pallet, heights of the supporters can be different in accordance with their locations.

In the V-shaped pallet, the taller supporters can be located as it goes from the center of the auxiliary pallet to the outer part thereof.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENTS

Reference will now be made in detail to the preferred embodiments of the present invention, examples of which are illustrated in the accompanying drawings.

Figure 1:
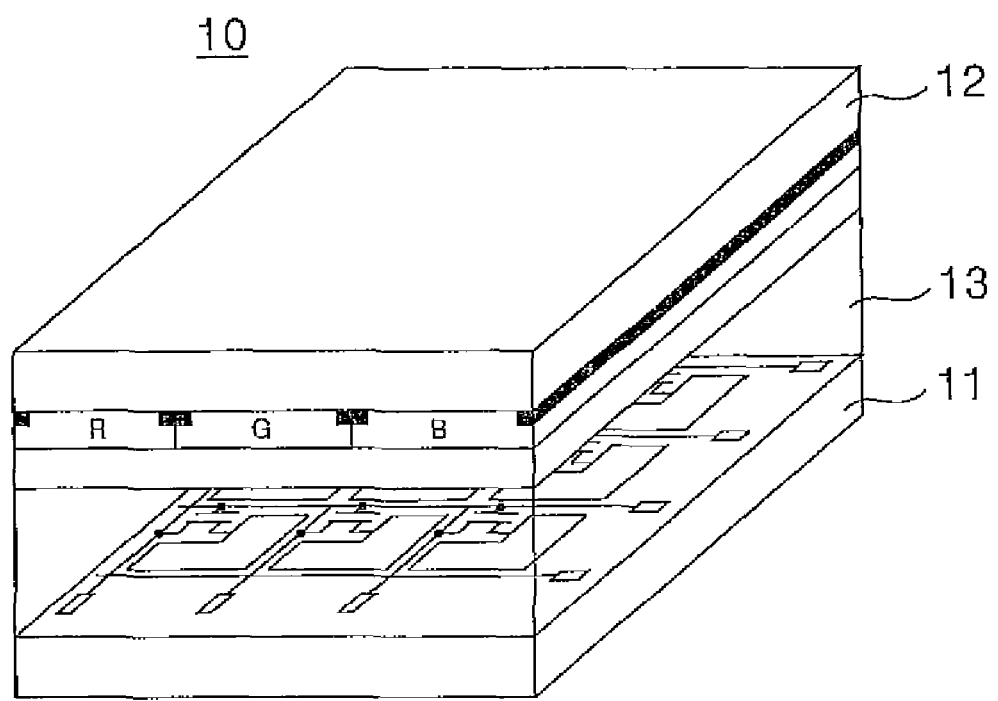
FIG. 1 is an exemplary diagram representing a liquid crystal display panel of a liquid crystal display device of the related art.
Figure 2:
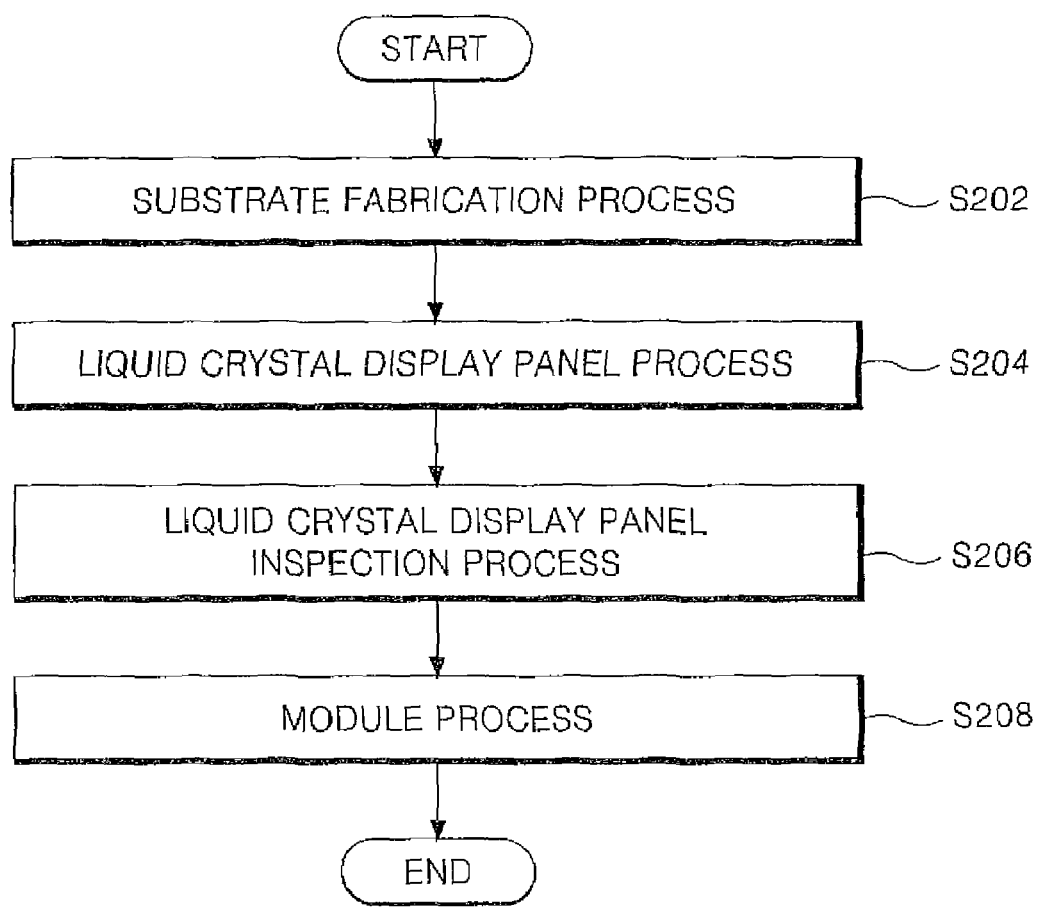
FIG. 2 is a flowchart representing a fabrication process of the liquid crystal display device of the related art.
Figure 3:
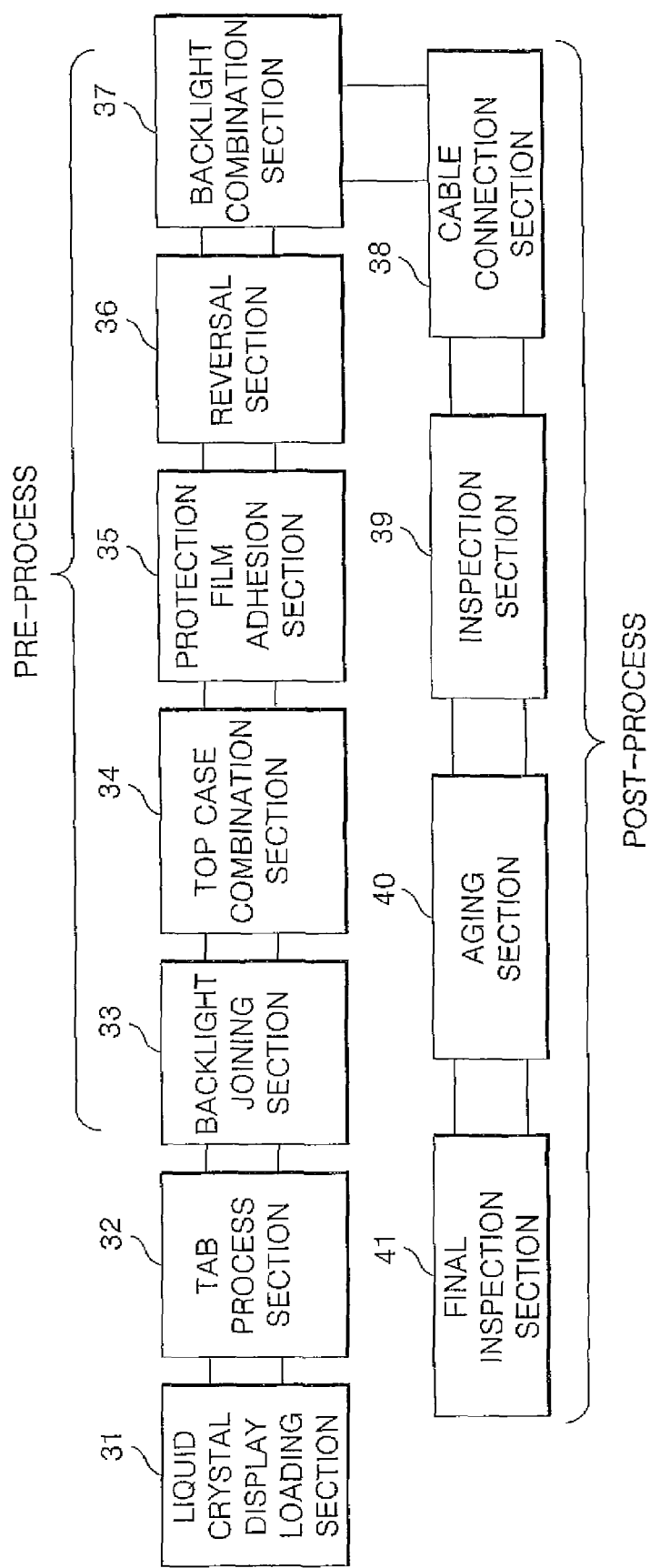
FIG. 3 is an exemplary diagram representing a process line of a module process of the related art.
Figure 4:
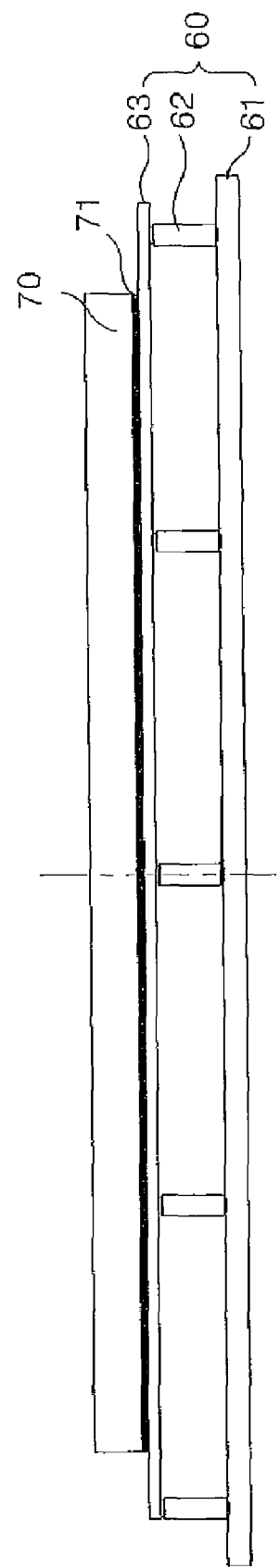
FIG. 4 is an exemplary diagram representing a usage state of a flat pallet of the related art.
Figure 5:
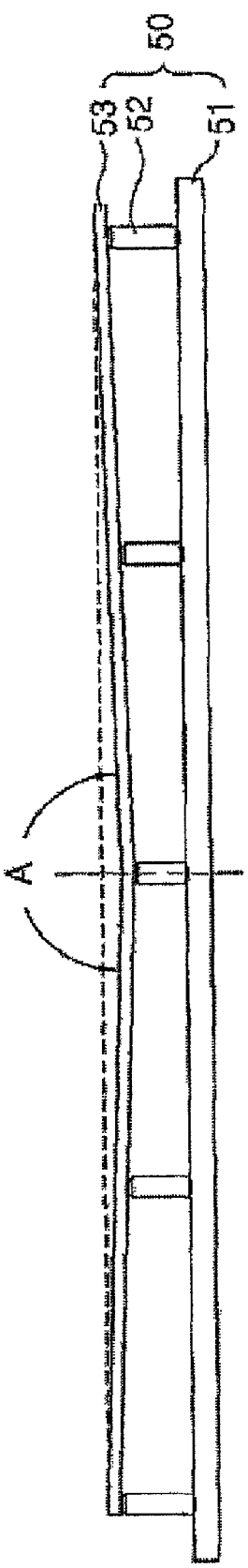
FIG. 5 is a perspective plan view of a V-shaped pallet according to the present invention.
Figure 6:
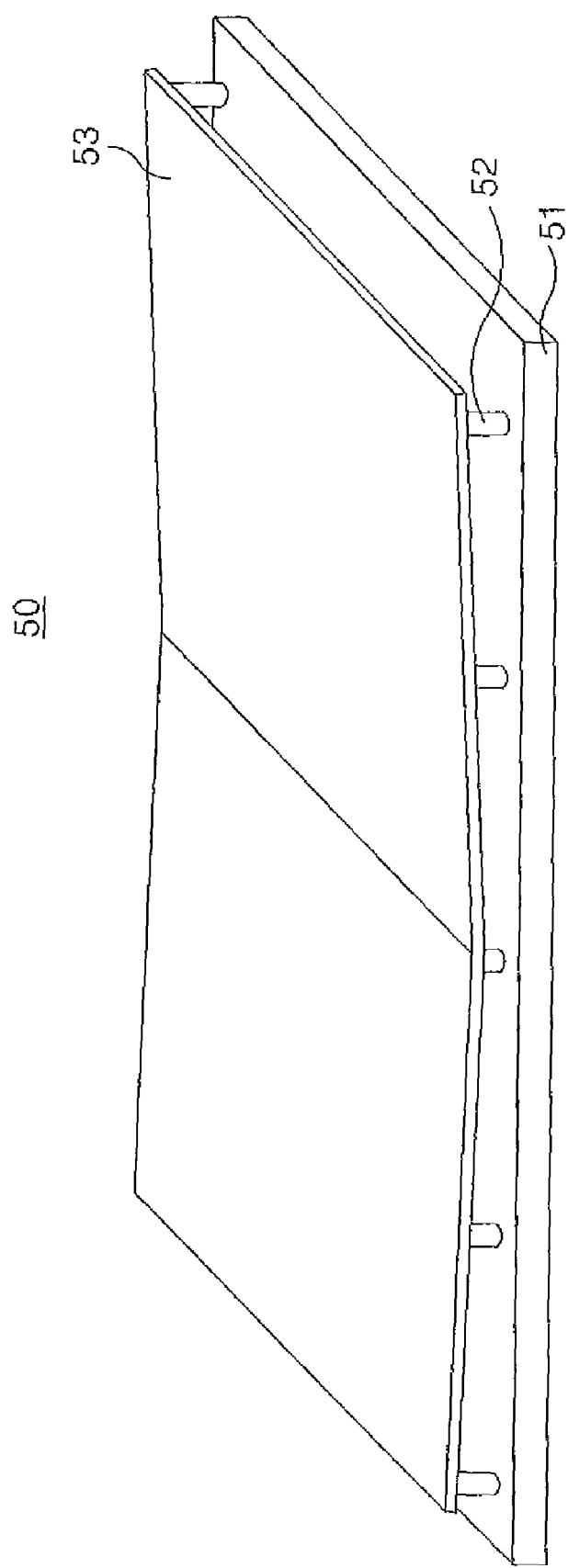
FIG. 6 is a side elevation of the V-shaped pallet shown in FIG. 5.

FIG. 5 is a perspective plan view of a V-shaped pallet according to the present invention, and FIG. 6 is a side elevation of the V-shaped pallet shown in FIG. 5.

That is to say, a V-shaped pallet 50 according to the present invention, as shown in FIGS. 5 and 6, includes a main pallet 51; an auxiliary pallet 53; and a plurality of supporters 52 for fixing the auxiliary pallet to the main pallet. The V-shaped pallet 50 has the middle part of the auxiliary pallet 53 subside so as to be in a V-shape as a whole. At this moment, the angle A of the subsiding part can be set in various ways in accordance with the size of the liquid crystal display device.

Accordingly, the angle can be set variously in accordance with the characteristic of 32 inch, 37 inch, 42 inch and 47 inch liquid crystal display devices which are currently fabricated.

Further, the material and other configuration of the V-shaped pallet can be applied in the same manner as the material and other configuration of a flat pallet which is currently used.

Figure 7:
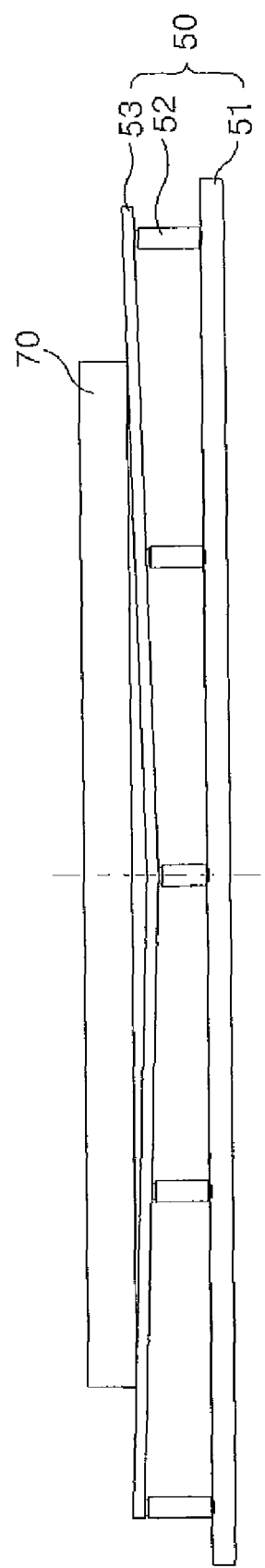
FIG. 7 is an exemplary diagram representing a usage state of the V-shaped pallet according to the present invention.

FIG. 7 is an exemplary diagram representing a usage state of the V-shaped pallet according to the present invention.

As described above, in the module process of the liquid crystal display device of the related art, the necessary assembly subjects are assembled on the flat pallet, and the liquid crystal display panel of the liquid crystal display device is made to be in contact with the flat pallet by turning over the liquid crystal display device in the reversal section 36 in order to carry out the assembly operation of the rear surface, i.e., the backlight unit part, of the liquid crystal display device.

At this moment, defects might be generated because scratches are generated in the liquid crystal display panel of the liquid crystal display device by impurities and a contact with the flat pallet, and the liquid crystal display device is turned over by the reversal section 36 after sticking a protection film to the liquid crystal display panel in the protection film adhesion section 35 for this.

However, the protection film can be used only in the pre-process after the reversal section 36, and in the post-process is required a process of removing the protection film again.

On the other hand, the present invention is for solving the problems described above, and the flat pallet used in the process after the reversal section 36 is configured to be in the V-shape, as shown in FIGS. 5 to 7, thus it is possible to solve the problem that the scratches and the like are generated in the liquid crystal display panel, without sticking the protection film to the liquid crystal display panel of the liquid crystal display device. However, the present invention is not limited thereto, thus the present invention can also be used in the process before the reversal section 36.

That is to say, as shown in FIG. 7, the middle part of the auxiliary pallet 53 in the V-shaped pallet 50 according to the present invention, which is in contact with the liquid crystal display panel of the liquid crystal display device 70, is formed in the V-shape, thus only edge part of the liquid crystal display panel is in contact with the auxiliary pallet 53, thereby making it possible to prevent the scratches from be generated in the liquid crystal display panel.

Further, the liquid crystal display panel is combined with the top case by the top case combination section 35, thus the part in contact with the auxiliary pallet 53 is substantially the top case part in FIG. 7 and the liquid crystal display panel part where the picture is directly displayed is not in contact with the auxiliary pallet 53 at all.

As described above, there is an excellent effect that no separate process is required in order to stick the protection film to or remove the protection film from the liquid crystal display panel of the liquid crystal display device according to the present invention.

Further, the present invention does not require operation personnel and the protection film for the process above, thus there is an excellent effect that a cost reduction effect can be generated as a whole.

Further, the present invention has an excellent effect that it is possible to remove various defect generation factors which might be generated by the contact between the liquid crystal display panel and the pallet.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A V-shaped pallet, comprising:
   a main pallet;
   an auxiliary pallet configured to put a liquid crystal display device in planar state being parallel to the main pallet thereon for performing a module process for the liquid crystal display device,
   wherein the auxiliary pallet has first and second plane sections jointed at a middle part of the auxiliary pallet and of which the middle part has a subsiding amount to have a V-shape as a whole,
   the first plane section is configured to contact a first bottom side edge of the liquid crystal display device, the second plane section is configured to contact a second bottom side edge being opposite to the first bottom side edge of the liquid crystal display device, and the first and the second plane sections are configured not to contact other two bottom side edges of the liquid crystal display device, and
   the auxiliary pallet has at least two abutting top surfaces without any additional supports formed thereon; and
   a plurality of supporters formed on the main pallet configured to fix the auxiliary pallet to the main pallet.

2. The V-shaped pallet according to claim 1, wherein a subsiding part of the auxiliary pallet is formed at a designated angle in accordance with the size of the liquid crystal display device.

3. The V-shaped pallet according to claim 1, wherein the auxiliary pallet is in contact with a top case of the liquid crystal display device.

4. A V-shaped pallet, comprising:
   a main pallet;
   an auxiliary pallet configured to put a liquid crystal display panel in planar state being parallel to the main pallet thereon; and
   a plurality of supporters located between the main pallet and the auxiliary pallet configured to fix the auxiliary pallet to the main pallet, and wherein the auxiliary pallet has first and second plane sections jointed in a V-shape to be configured that a gap between the main pallet and the auxiliary pallet becomes smaller as it goes from an outer part of the auxiliary pallet to a middle part of the auxiliary pallet, wherein the first plane section is configured to contact a first bottom side edge of the liquid crystal display panel and the second plane section is configured to contact a second bottom side edge being opposite to the first bottom side of the liquid crystal display panel, wherein the first and the second plane sections are configured not to contact other two bottom side edges of the liquid crystal display panel, and wherein the auxiliary pallet has at least two abutting top surfaces without any additional supports formed thereon.

5. The V-shaped pallet according to claim 4, wherein the auxiliary pallet is in contact with a top case of the liquid crystal display device.

6. The V-shaped pallet according to claim 4, wherein heights of the supporters are different in accordance with their locations.

7. The V-shaped pallet according to claim 6, wherein the taller supporters are located as it goes from the center of the auxiliary pallet to the outer part thereof.

8. The V-shaped pallet according to claim 1, wherein the auxiliary pallet is sized to receive one liquid crystal display device at a time.

9. The V-shaped pallet according to claim 4, wherein the auxiliary pallet is sized to receive one liquid crystal display device at a time.

* * * * *